United States Patent [19]

Glimpel

[11] Patent Number: 5,127,776
[45] Date of Patent: Jul. 7, 1992

[54] TAP WITH RELIEF

[75] Inventor: Helmut Glimpel, Lauf a.d. Pegnitz, Fed. Rep. of Germany

[73] Assignee: Emuge-Werk Richard Glimpel Fabrik für Präzisionswerkzeuge vormals Moschkau & Glimpel, Lauf/Pegnitz, Fed. Rep. of Germany

[21] Appl. No.: 750,753

[22] Filed: Aug. 22, 1991

Related U.S. Application Data

[63] Continuation-in-part of Ser. No. 638,625, Jan. 8, 1991, abandoned.

[30] Foreign Application Priority Data

Jan. 19, 1990 [DE] Fed. Rep. of Germany ....... 4001481

[51] Int. Cl.⁵ .................................................. B23G 5/06
[52] U.S. Cl. .................................... 408/220; 408/222; 470/198
[58] Field of Search ............................... 408/215-222; 10/141 R

[56] References Cited

U.S. PATENT DOCUMENTS 1,845,063  2/1932  Trbojevich .................. 408/220

FOREIGN PATENT DOCUMENTS 589096  1/1978  U.S.S.R. .................. 10/141 R
1060365  12/1983  U.S.S.R. .................. 10/141 R
1328094  8/1987  U.S.S.R. .................. 10/141 R

Primary Examiner—Steven C. Bishop
Attorney, Agent, or Firm—Toren, McGeady & Associates

[57] ABSTRACT

There is a tap whose thread portion 2 forms a cutting section 5 and a guiding section 6 and is provided on a plurality of adjacent thread teeth of the cutting section 5 with a relief 8. It is desirable that a further machining measure be provided for the tap whereby favorable compromises can be obtained with respect to guidance and friction. This is achieved in that the relief 8 of the adjacent cutting-section 5 thread teeth—seen in a longitudinal direction—have a clearance angle which varies increasingly or decreasingly. Varying the relief enables the requirements with respect to avoiding incorrect tapping and avoiding friction-generated cold welding to be met and matched up in an improved manner.

3 Claims, 2 Drawing Sheets

TAP WITH RELIEF

This is a continuation of application Ser. No. 07/638,625, filed Jan. 8, 1991, now abandoned.

BACKGROUND OF THE INVENTION

The invention relates to a tap whose threaded portion forms a cutting section and a guiding section and is essentially cylindrical and provided on a plurality of adjacent thread teeth of the cutting section with a relief whose clearance angle is related to the thread tooth with the maximum pitch or effective diameter.

In a prior art (DE-PS 32 26 355) tap of this kind, the reliefs of the adjacent cutting-section thread teeth—seen in a longitudinal direction—have constant clearance angles. If the relief is kept small, the guiding properties are little affected and friction or the risk of cold welding is relatively high. If the relief is large, the guiding properties would be appreciably affected and friction or the risk of cold welding would be relatively small. With a view to better reconciling the contradictory requirements with respect to guiding properties and friction, the tap is formed with a back taper over the thread section. However, the magnitude of the back taper must be only small because otherwise the thread produced may have profile errors.

SUMMARY OF THE INVENTION

It is an object of the present invention to disclose a further machining measure for a tap of the type initially referred to which will permit favourable comprises with respect to guidance and friction. In achieving this object, the tap according to the invention is characterized in that the reliefs of adjacent cutting-section thread teeth—seen in the longitudinal direction—vary increasingly or decreasingly in their clearance angle.

The variation of the relief enables the requirements with respect to avoiding incorrect tapping and avoiding friction-generated cold welding to be met and matched up in an improved manner. The variable relief affords improved compromises between improving the cutting properties and still acceptable guiding properties.

The term "cylindrical thread portion"—is understood here to mean a thread portion with or without taper. The term "relief" means not only the flank relief but also the profile relief where the thread teeth are relief-ground on their flanks and on the outside. The tap, for instance, may be suitably fluted or it may be a tap without flutes, i.e. a grooving tap where the tooth is determined by the profiling. The amount of relief may also be expressed in terms of "feed" instead of by the clearance angle. The term "feed" or "relief size" means the amount of metal removed by relief grinding which is determinable at a pre-determined distance from the start of the relieved region or material removal and which is the same for all thread teeth.

It is conceivable to provide the variation of relief over only part of the length of the cutting section which is provided with relief over its full length. It is specially desirable and advantageous, however, to have the variation of relief extend over the full length of the cutting section. This will afford full utilization of the advantages of relief variation on the cutting section and production of the thread of the tap will be simplified.

It is possible to provide the guiding section with a constant relief. It is specially desirable and advantageous, however, to have the reliefs of adjacent guiding-section thread teeth—seen in the longitudinal direction—vary increasingly or decreasingly in their clearance angle. This affords further possibilities of matching guidance and friction to specific conditions in an improved manner. As a rule, the clearance angle of the relief decreases in the direction towards the back end of the thread portion. This affords improved guidance when the thread portion is inserted with its full length in the material to be tapped.

The variation of relief on the cutting section and the guiding section is either steady or in steps, two or more adjacent thread teeth having the same relief. Stepwise variation in terms of this invention means that two or more steps are provided. The rate and direction of the variation of relief is matched to the material to be tapped and the type of machine in which the tap is to be used. State-of-the-art NC-machine tools used for the manufacture of the tap permit finely controlled variation of relief, for instance, by varying the position of the grinding wheel producing the relief during the machining of the tap.

It is specially desirable and advantageous if the relief variation comprises reliefs with a clearance angle of 5 minutes to 2 degrees. As a rule, therefore, there would be no part of the thread portion without any relief. The amount of relief can be increased to an exceptionally large extent.

It is specially desirable and advantageous for the cutting-section relief to decrease from the front towards the back. Such a tap would be used on a high-speed machine with a spindle guided for correct lead for high-strength materials. A high-speed machine tool would have a cutting speed of more than 20 m/min and a high-strength material would have a tensile strength of more than 900 N/mm$^2$. The tap would be well guided by the machine tool and the material-cutting region of the cutting section thanks to the increased relief would produce reduced friction and a true-to-gauge thread in spite of the high cutting speed and the high-strength material.

It is specially desirable and advantageous, on the other hand, to have the cutting-section relief increase from front to back. Such a tap would be used on a conventionally running machine where spindle guidance is not with accurate lead for materials having normal hardnesses. A conventionally running machine tool would have a cutting speed below 20 m/min and a material of normal hardness would have a tensile strength of less than 900 N/mm$^2$. The tap will be well guided in the material at the front end region of the cutting section and an excessive increase in friction will be avoided by the increase of relief towards the back.

BRIEF DESCRIPTION OF THE DRAWINGS

Preferred embodiments of the invention are illustrated in the drawing in which.

DETAILED DESCRIPTION OF THE PREFERRED EMBODIMENTS

Figure 1:
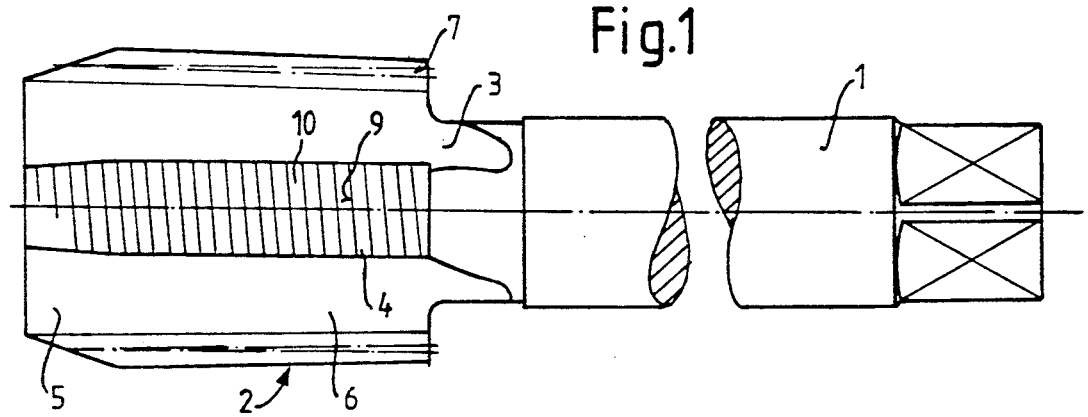
FIG. 1 is a side elevation of a tap with relief.
Figure 2:
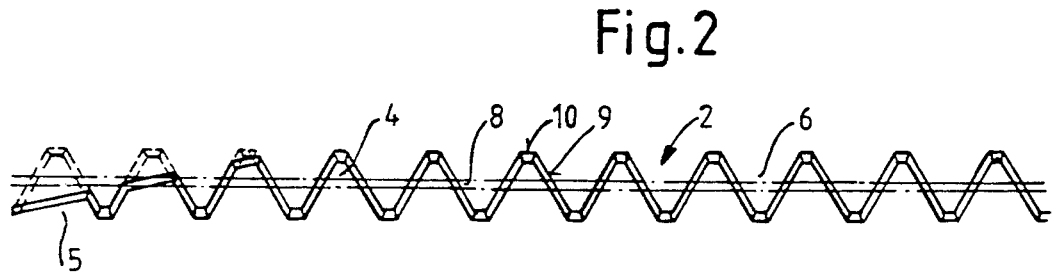
FIG. 2 is a schematic representation of several thread teeth of the tap shown in FIG. 1.

Referring to FIGS. 1 and 2 in the drawing, a tap is formed on a shank 1 with a substantially cylindrical thread portion 2 which, apart from a back taper 7, is stepless over its length and has a constant pitch diameter. The thread portion 2 is provided with flutes 3 subdividing the thread courses into thread teeth 4. The thread portion 2, seen in a longitudinal direction, is subdivided into a shorter cutting section 5 at the front and a longer guiding section 6 at the back. The cutting section 5 is conically chamfered at its front thread teeth which is indicated by the dashed line in FIG. 2.

The thread portion 2 is provided over its full length with a relief 8 which is indicated in FIG. 2 by two lines at the level of the pitch diameter and provided as a profile relief both on the flanks 9 and on the outside 10 of the thread teeth 4.

Figure 3:
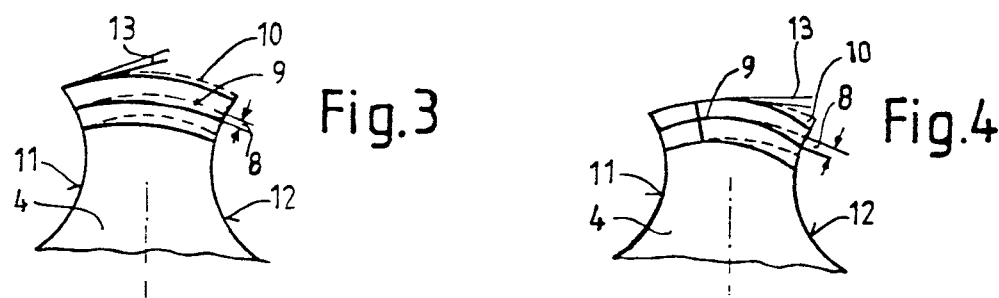
FIG. 3 is a schematic side elevation of a first thread tooth with relief.
Figure 4:
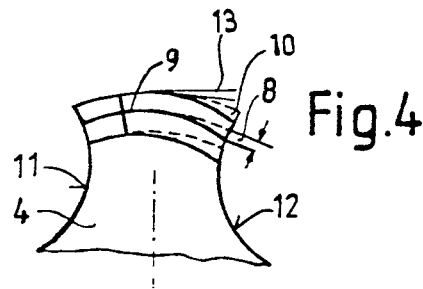
FIG. 4 is a schematic side elevation of a second thread tooth with relief.
Figure 5:
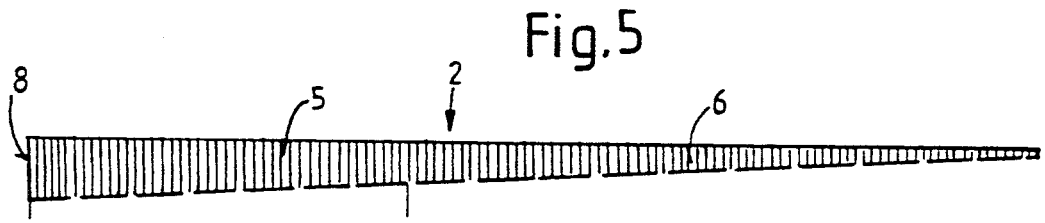
FIGS. 5 to 11 each show schematically a first to seventh pattern of a relief varying along a thread portion.
Figure 6:
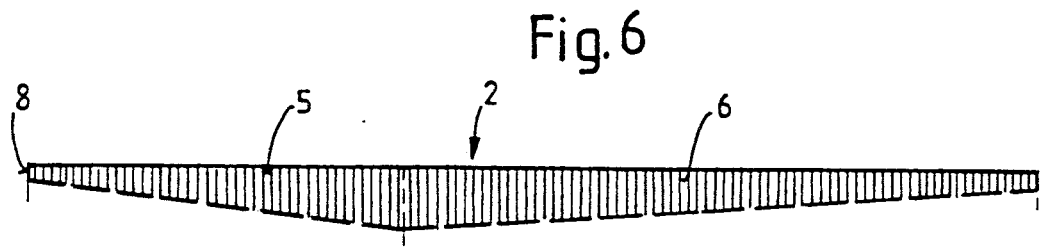

FIGS. 3 and 4 show two different versions of the relief 8 which is constituted by metal removal which increases in the direction from the tooth front 11 to the back 12 of the tooth and reduces the cross-sectional area of the tooth. Whereas the relief 8 in FIG. 3 starts at the front 11 of the tooth, in FIG. 4 it starts at a distance from the front 11 of the tooth. The relief provides a clearance angle 13 between the relieve-ground surface and the imaginary surface existing prior to relief grinding and at the back of the tooth as a feed corresponding to the metal removal.

Figure 7:
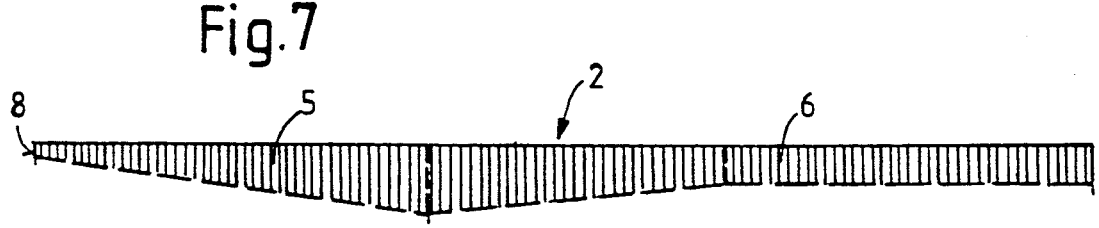
Figure 8:
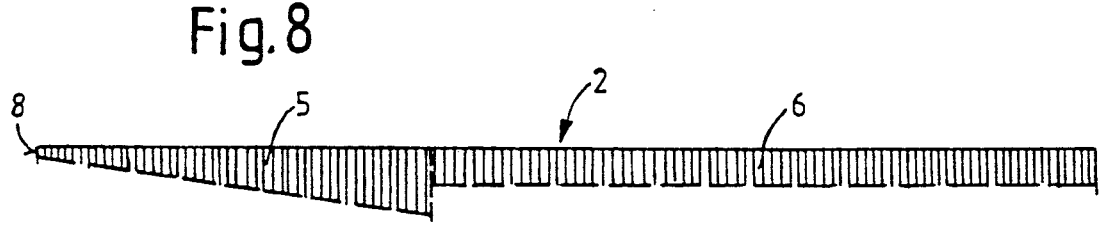
Figure 9:
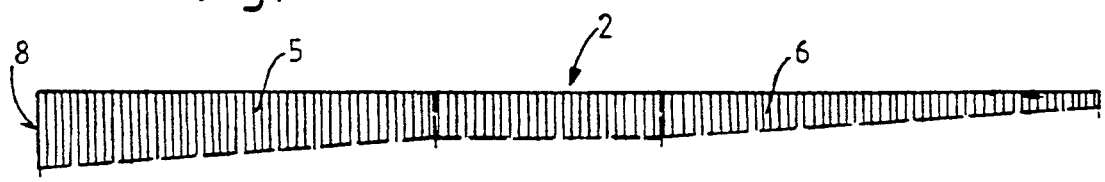
Figure 10:
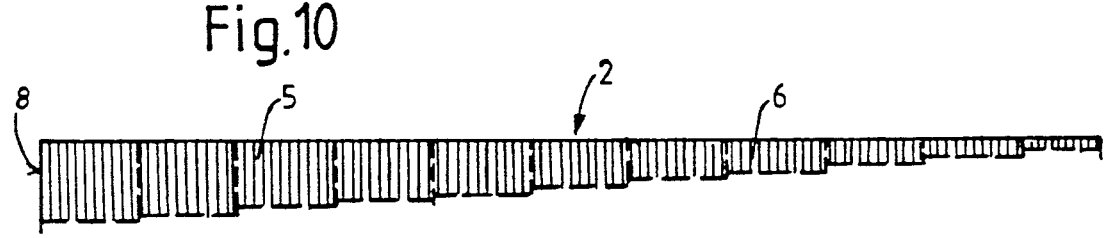
Figure 11:
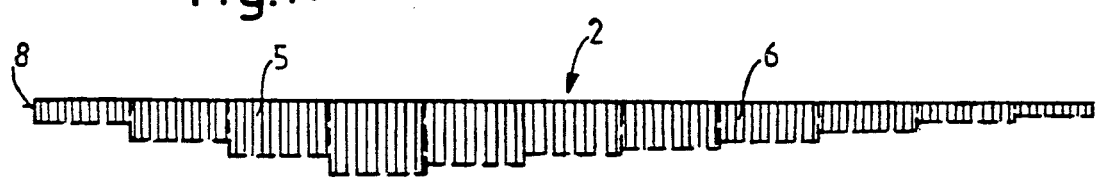

As shown in FIG. 5 to 11, the amount of relief 8 varies over the length of the thread portion 2. As shown in FIGS. 5 to 9, the variation of relief is steady, i.e. the increase or decrease is in small steps from one thread tooth to the next adjacent thread tooth. According to FIGS. 10 and 11, the variation of the relief is stepwise, i.e. a group of thread teeth with the same relief follows a group of thread teeth with the same relief, the size of which is substantially increased or decreased. The variation of relief is always provided on the cutting section 5 and, as a rule, is also provided on the guiding section 6 which, however, may be formed with the same relief throughout as shown in FIG. 8. The relief in the cutting section 5 according to FIGS. 5, 9 and 10 decreases from a high value at the front towards the back and, according to FIGS. 6, 7, 8 and 11 increases from a low value at the front towards the back. The variation need not end on the cutting section 5, but may also extend onto the guiding section 6. In the guiding section 6, the relief decreases from front to back as shown in the drawing, unless additional constant-relief regions are provided as shown in FIGS. 7 and 9.

I claim:

1. A tap having a threaded portion including a toothed cutting portion and a guiding portion, and being essentially cylindrical, the threaded portion having reliefs at several adjacent thread teeth of the cutting portion, the reliefs having clearance angles based upon a cutting portion thread tooth with a maximum flank diameter, the reliefs of adjacent cutting portion thread teeth, viewed in a longitudinal direction, having clearance angles that increase from front to rear, the reliefs of adjacent guiding portion teeth, viewed in a longitudinal direction, having clearance angles that decrease from front to rear.

2. A tap according to claim 1, wherein the relief clearance angles vary along the entire length of the cutting portion.

3. A tap according to claim 1 or 2, wherein the relief clearance angles vary from 5 minutes to 2°.

* * * * *